(12) United States Patent
Senneff et al.

(10) Patent No.: US 10,173,778 B2
(45) Date of Patent: Jan. 8, 2019

(54) BUTTON ASSEMBLY FOR SEAT POSITION CONTROL

(71) Applicant: ITT MANUFACTURING ENTERPRISES LLC, Wilmington, DE (US)

(72) Inventors: James Senneff, Buffalo, NY (US); Tim Boerschig, Amherst, NY (US); Terrance E. Daul, Hamburg, NY (US)

(73) Assignee: ITT Manufacturing Enterprises LLC, Wilmington, DE (US)

( * ) Notice: Subject to any disclaimer, the term of this patent is extended or adjusted under 35 U.S.C. 154(b) by 0 days.

(21) Appl. No.: 15/156,373

(22) Filed: May 17, 2016

(65) Prior Publication Data

US 2017/0334563 A1 Nov. 23, 2017

(51) Int. Cl.

| | | |
|---|---|---|
| *B64D 11/06* | (2006.01) |
| *F16C 1/12* | (2006.01) |
| *G05G 1/02* | (2006.01) |
| *A47C 1/02* | (2006.01) |
| *F16C 1/10* | (2006.01) |
| *B60N 2/02* | (2006.01) |
| *H02B 1/048* | (2006.01) |

(52) U.S. Cl.
CPC .............. *B64D 11/064* (2014.12); *A47C 1/02* (2013.01); *B60N 2/02* (2013.01); *F16C 1/102* (2013.01); *F16C 1/12* (2013.01); *G05G 1/02* (2013.01); *H02B 1/048* (2013.01)

(58) Field of Classification Search
CPC ..... B64D 11/0639; B64D 11/064; A47C 1/02; F16C 1/10; F16C 1/102; F16C 1/12; G05G 1/02; G05G 1/025; H02B 1/048; H01H 9/02; H01H 13/56; H01H 17/00; H01H 17/16; H01H 17/18; H01H 19/003; H01R 13/74; H01R 13/743; H01R 13/745; B60N 2/02
See application file for complete search history.

(56) References Cited

U.S. PATENT DOCUMENTS 2,605,374 A * 7/1952 Batcheller ............ H01H 13/183
200/295
3,213,189 A * 10/1965 Mitchell ................. F16B 9/203
174/138 R (Continued)

FOREIGN PATENT DOCUMENTS

| | | |
|---|---|---|
| DE | 196 50 823 C1 | 1/1998 |
| EP | 0 796 576 A1 | 9/1997 |

OTHER PUBLICATIONS

Machine translation of DE 19650823 C1 obtained on Sep. 19, 2017.*

(Continued)

*Primary Examiner* — Adam D Rogers
(74) *Attorney, Agent, or Firm* — Barclay Damon, LLP

(57) ABSTRACT

Button assemblies for controlling a seat position and for mounting on a seat panel are provided. The button assemblies may have a button housing having a portion that is configured to position over edges of an opening in the seat panel. One or more flexible retaining members integral to or attached to the button housing are configured to compress through the opening in the seat panel and expand therein positioned opposite an inner surface thereof upon insertion, securing the assembly within the opening.

9 Claims, 4 Drawing Sheets

(56) References Cited

U.S. PATENT DOCUMENTS

| | | | |
|---|---|---|---|
| 4,159,405 A | | 6/1979 | Semonchik et al. |
| 4,211,905 A | * | 7/1980 | Quigley ................. H02B 1/048 200/16 C |
| 4,515,034 A | | 5/1985 | Porter |
| 5,010,780 A | * | 4/1991 | Hatfield .................... F16C 1/12 74/501.5 R |
| 5,146,056 A | * | 9/1992 | Kuczynski ............. H02B 1/048 200/295 |
| 5,541,569 A | | 7/1996 | Jang |
| 5,727,675 A | | 3/1998 | Leveque et al. |
| 6,132,245 A | * | 10/2000 | Wertz ................. H01R 13/5219 439/268 |
| 6,313,404 B1 | * | 11/2001 | Yu .......................... H02B 1/048 174/50 |
| 7,459,649 B2 | * | 12/2008 | Huang ................... H02B 1/048 200/321 |
| 8,809,715 B2 | * | 8/2014 | Meyer ....................... F16C 1/10 200/314 |
| 9,640,343 B2 | * | 5/2017 | Koch ................... H01H 9/0207 |

OTHER PUBLICATIONS

European Search Report for EP 17 169 026.6; dated Jul. 31, 2017; 8 pages.

European Examination Report for EP 17 169 026.6; dated Sep. 10, 2018; 3 pages.

\* cited by examiner

BUTTON ASSEMBLY FOR SEAT POSITION CONTROL

TECHNICAL FIELD

This application generally relates to the field of mechanical actuators that are used, for example, in connection with reclining seats and related systems, and more particular to button assemblies for controlling positions of such seats.

BACKGROUND

Reclining seats or chairs are commonly deployed in various industries, including, for example, the airline industry. Typically, hydraulic or mechanical actuators are used to allow for positioning such seats in various positions. For example, the actuators enable the seat to assume an upright position as well as a continuous range of reclined positions. In order to control the positions of these seats, at least one control button may be provided. The control buttons may be used to engage, for example, an activator cable for the seat system, wherein the button assemblies may be deployed within armrests or other seat panels.

In terms of manufacture, prior art button assemblies normally require the installer to hold the button assembly from the underside while installing a button housing or sleeve on the outside in order to lock the button assembly into the panel. This may be difficult, particularly if space is limited around the button assembly. Therefore, a general need exists for enhanced button assemblies for controlling the position of reclining seats, which are also capable of being quickly and easily installed from the outside of the panel.

BRIEF DESCRIPTION

Therefore and according to one aspect, there is provided a button assembly for controlling a seat position and mounting on a seat panel. The button assemblies may have a button housing configured to position over edges of an opening in the seat panel and opposite an outer surface thereof. One or more flexible retaining members may be attached to a portion of the button housing, in which the one or more flexible retaining members are configured to compress when advanced through the opening in the seat panel and expand therein positioned opposite an inner surface thereof when the assembly is seated.

In another aspect, the one or more flexible retaining members include at least one flexible finger extending outward from the button housing. The flexible finger may be configured to expand into the seat panel with ends of the flexible finger positioned opposite the inner surface of the seat panel. A mechanical force of the ends of the flexible finger against the inner surface of the seat panel may inhibit removal of the button assembly from the seat panel.

In a further aspect, the one or more flexible retaining members include at least one flexible reflexed portion, the flexible reflexed portion bowing outward from the button assembly. The flexible reflexed portion may be configured to compress through the opening in the seat panel and expand into the seat panel with middle portions of the flexible reflexed portion positioned opposite the inner surface of the seat panel. A frictional force of the middle portion of the flexible reflexed portion against the edge of opening in the seat panel may inhibit removal of the button assembly from the seat panel.

An advantage realized by the herein described button assembly is that in ease and reliability of manufacture relative to a seat panel. The button assemblies can be fabricated without requiring additional materials or cost and in which the assemblies can be assembled within a space constrained environment and in a simpler manner due to the ability for the button assembly to snap into the seat panel without having to be held in place during a complex mounting operation.

These and other embodiments, features and advantages will become apparent to those skilled in the art when taken with reference to the following more Detailed Description in conjunction with the accompanying drawings that are first briefly described.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention (wherein like numerals represent like elements).

DETAILED DESCRIPTION

The following Detailed Description should be read with reference to the drawings, in which like elements in different drawings are identically numbered. The drawings, which are not necessarily to scale, depict selected embodiments and are not intended to limit the scope of the invention. The Detailed Description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention.

The present disclosure provides, in part, button assemblies for controlling seat positions, for use in, for example, airline seats. By way of example, airline seats may include positioning features for passenger comfort during travel. For example, seat backs may recline, foot rests may extend outward, lumbar supports may be provided, etc. Space around the button assembly may be limited, such as in a seat arm. This limitation in space makes it difficult to install a button assembly, particularly if the button assembly must be held from the underside for purposes of installation. Advantageously, the present disclosure provides button assemblies, such as snap-in button assemblies that are capable of being mounted on a seat panel, such as an armrest or a sidewall quickly and easily from the outside of the panel only. By contrast with conventional button assemblies, the button assemblies disclosed herein may be mounted onto the seat panel or armrest without having to hold the button assembly from the underside of the panel where space is limited. For example, the present button assemblies include one or more flexible retaining members which compress through a seat panel opening during installation and expand to a nominal position once the button assembly is advanced through the opening within the seat panel.

Figure 1A:
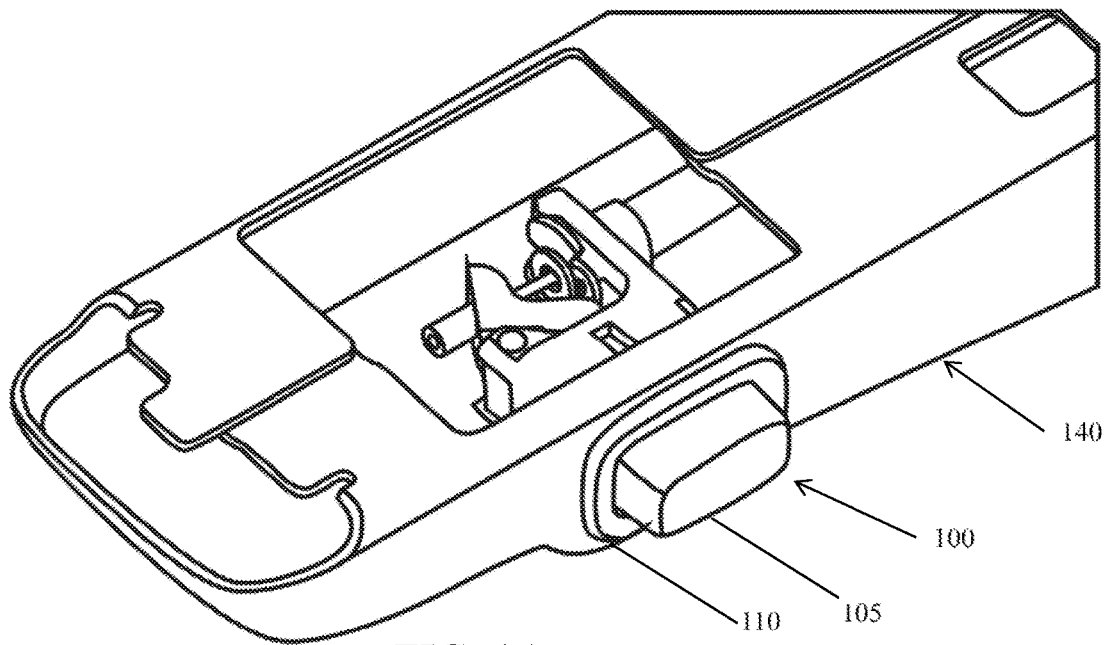
FIG. 1A is a side perspective view of a button assembly in accordance with one embodiment as mounted in a seat arm panel of a seat, and in accordance with aspects set forth herein.
Figure 1B:
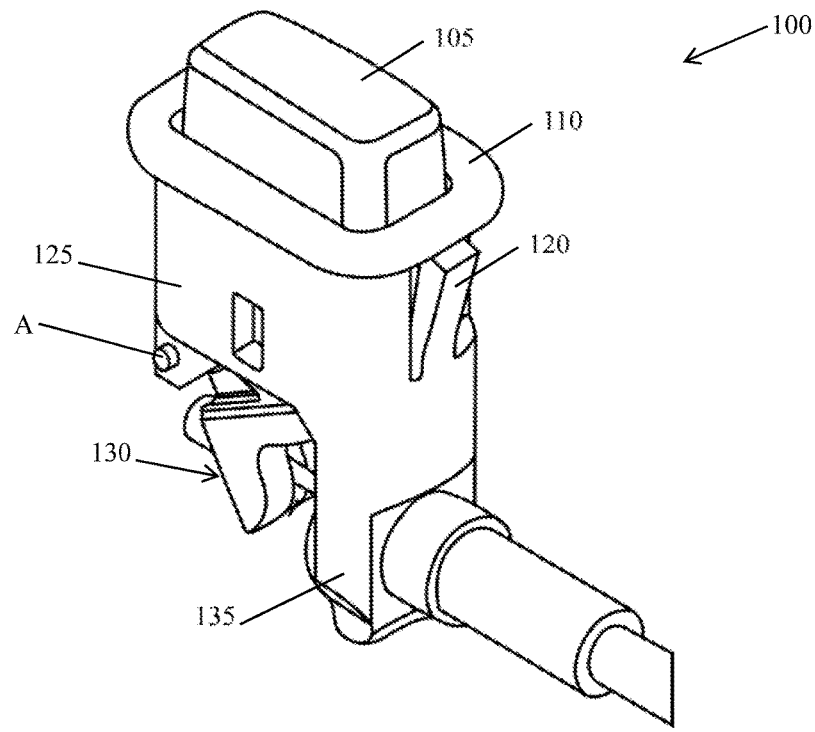
FIG. 1B is a top perspective view of the button assembly of FIG. 1A.

FIGS. 1A-1E depict a button assembly 100 in accordance with a first embodiment. With reference to FIG. 1A, the button assembly 100 is shown in a mounted position relative to a seat panel 140 (partially shown), the assembly 100 including an actuable button 105 which is used selectively by the occupant of the seat to control a position of the seat (not shown), as described in detail herein.

FIGS. 1B-1E provide various views of the button assembly 100, in accordance with FIG. 1A. The button assembly 100 according to this embodiment includes an actuable button 105, a button housing 125 and one or more flexible retaining members 120, as well as an outer cap or cover portion 110.

Figures 1C, 1D:
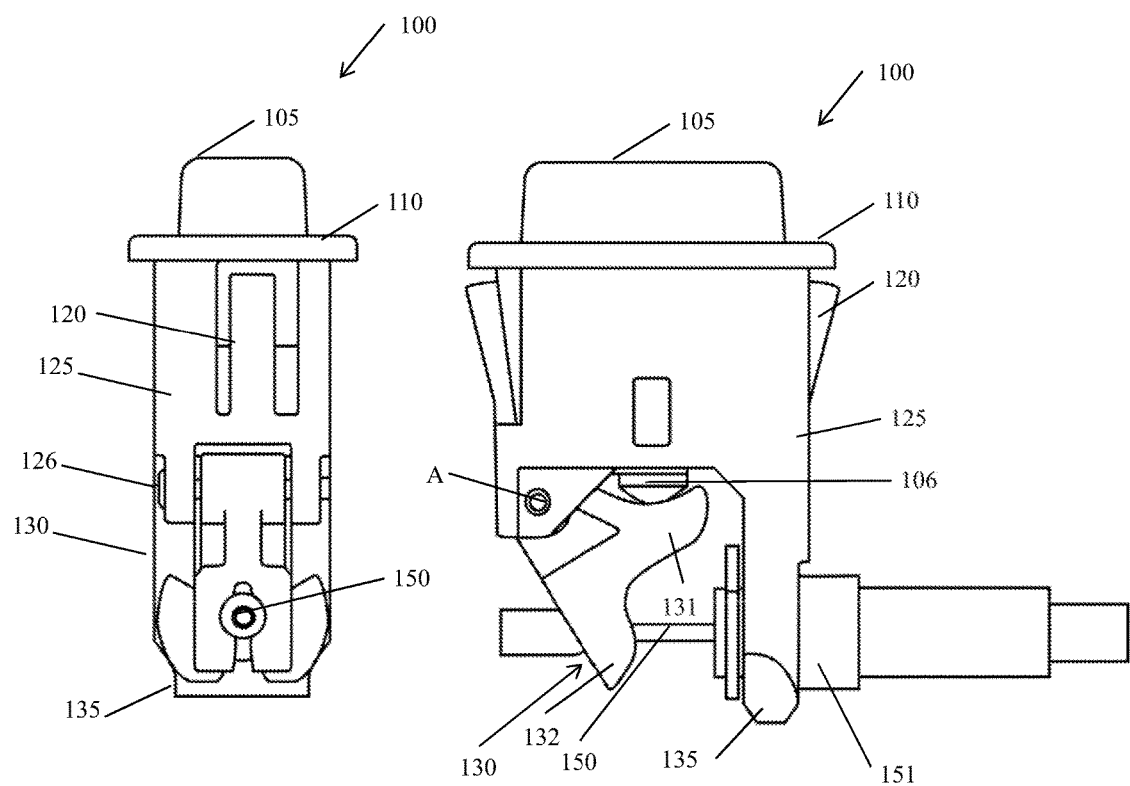
FIG. 1C is an end view of the button assembly of FIGS. 1A-1B.
FIG. 1D is a side elevational view of the button assembly of FIGS. 1A-1C.
Figure 1E:
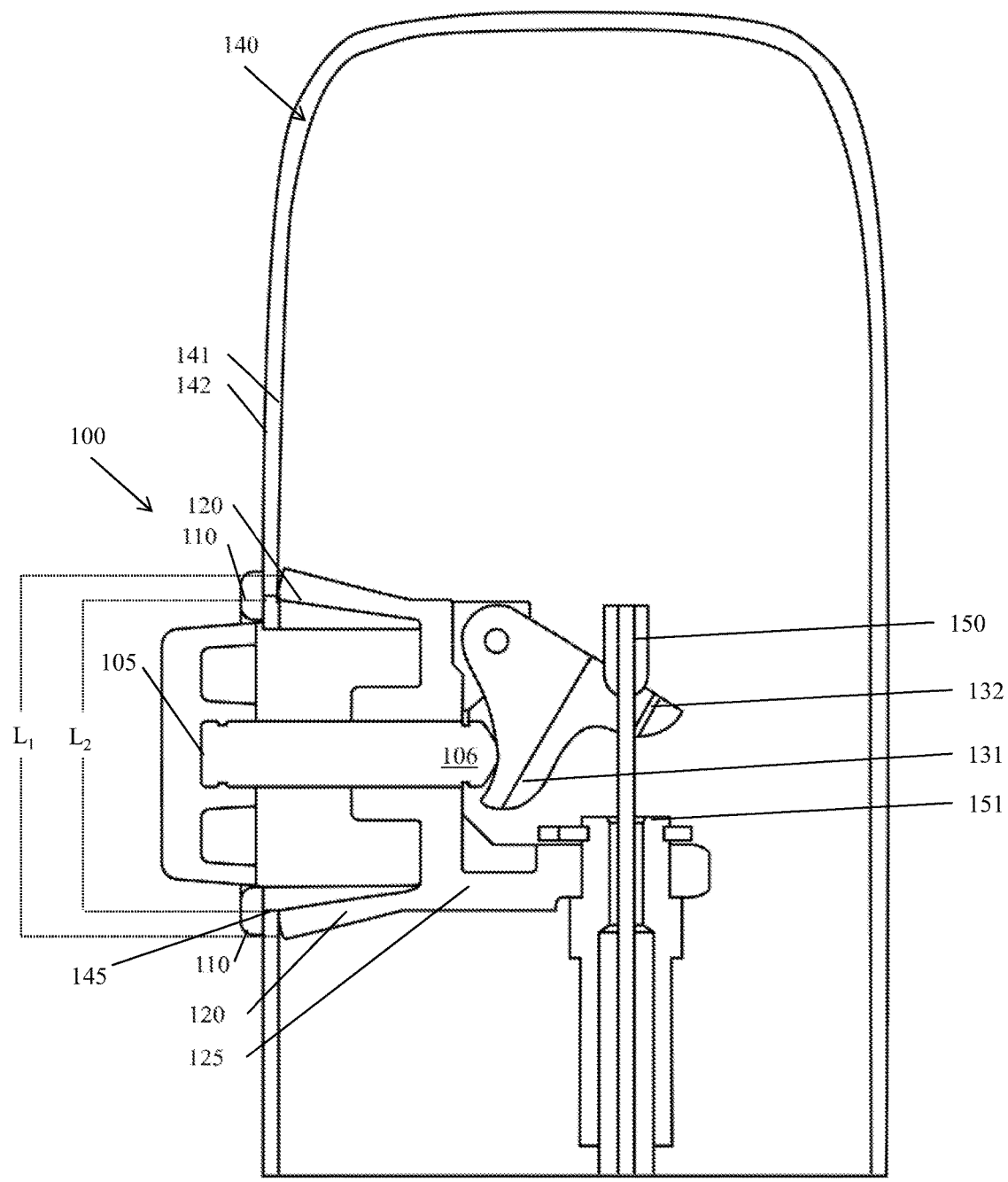
FIG. 1E is a side elevational view, shown in section, of the button assembly of FIGS. 1A-1D shown in an assembled position in a seat panel.

Further, the button assembly 100 according to this depicted embodiment includes a control cable activator 130 and a control cable holder 135, attached to a lower end of the button housing 125. When installed and as best shown in FIGS. 1C-1E, the control cable activator 130 includes a first engagement arm 131 that is initially disposed in relation to a lower shaft-like portion 106 of the actuable button 105 and a second engagement arm 132 having a through opening that supports a portion of a control cable 150, the latter being further housed within a control cable control sleeve 151. In operation, pressing the actuable button 105 will cause the lower portion 106 of the button 105 to contact the first engagement arm 131 of the control cable activator 130, the latter being pivotally attached by means of a pinned bracket 126 to the button housing 125 at a pivot point A. When engaged and according to this embodiment, the control cable activator 130 rotates clockwise, causing the supported control cable 150 to move from a first position to a second position (to the left as viewed in FIG. 1D and upward as shown in FIG. 1E). The control cable sleeve 151 is held in place, preferably by the control cable holder 135 during such movement.

FIG. 1E is a cross-sectional view of the button assembly 100 as mounted in an opening 145 in seat panel 140, in accordance with aspects set forth herein. According to this embodiment, a flexible retaining member 120 is provided on opposing lateral sides of the button housing 125, each flexible retaining member 120 being defined by a wedge shaped configuration including a cantilevered end that extends outwardly relative to the exterior surface of the button housing 125. When fabricated, the retaining members nominally assume a outwardly flexed position in which each member is configured to inwardly flex toward the outer surface of the button housing 125 when acted upon by a compressive force.

Upon insertion of the button assembly 100 into the seat panel 140 and when passing the edge of the opening 145, the inserted end of the one or more flexible retaining members 120 has a narrower width than the outer end, so that the members 120 may readily pass through the opening 145 and into the seat panel 140. As the button assembly 100 progresses into the opening 145, the one or more flexible retaining member 120 flex inward against the compressive force of the edges of the opening 145, allowing entry into the defined opening 145. Once the widest portion of the flexible retaining members 120 clears the opening 145, the flexible retaining members 120 are caused to bend outward, thereby returning the members to their original cantilevered shape and position due to the cessation of the compressive force. In the nominal seated position of the button assembly 100 within the seat panel 140 depicted in FIG. 1E, the cantilevered ends of flexible retaining members 120 are positioned opposite an inner surface 141 of the seat panel 140, and beyond the outer edge of the opening 145. This cantilevered positioning of the one of more flexible retaining members 120 against the inner surface 141 restricts removal of the button assembly 140 from the seat panel 140.

Still referring to FIG. 1E and when the button assembly 100 is seated, the outer cover or cap portion 110 of the button housing 125 defines a shoulder that covers an edge surface of the opening 145 in which the upper cover or cap portion 110 has an outer dimension ($L_1$) relative to the width ($L_2$) of the opening 145. In such a case, the upper cover or cap portion 110 of the button housing 125 is therefore positioned over the edge of the opening 145 and against the outer surface 142 of the seat panel 140. As previously noted, the number of flexible retaining members 120 may vary, depending on the mechanical strength desired, the materials employed, the dimensions of the parts, etc.

Figure 2:
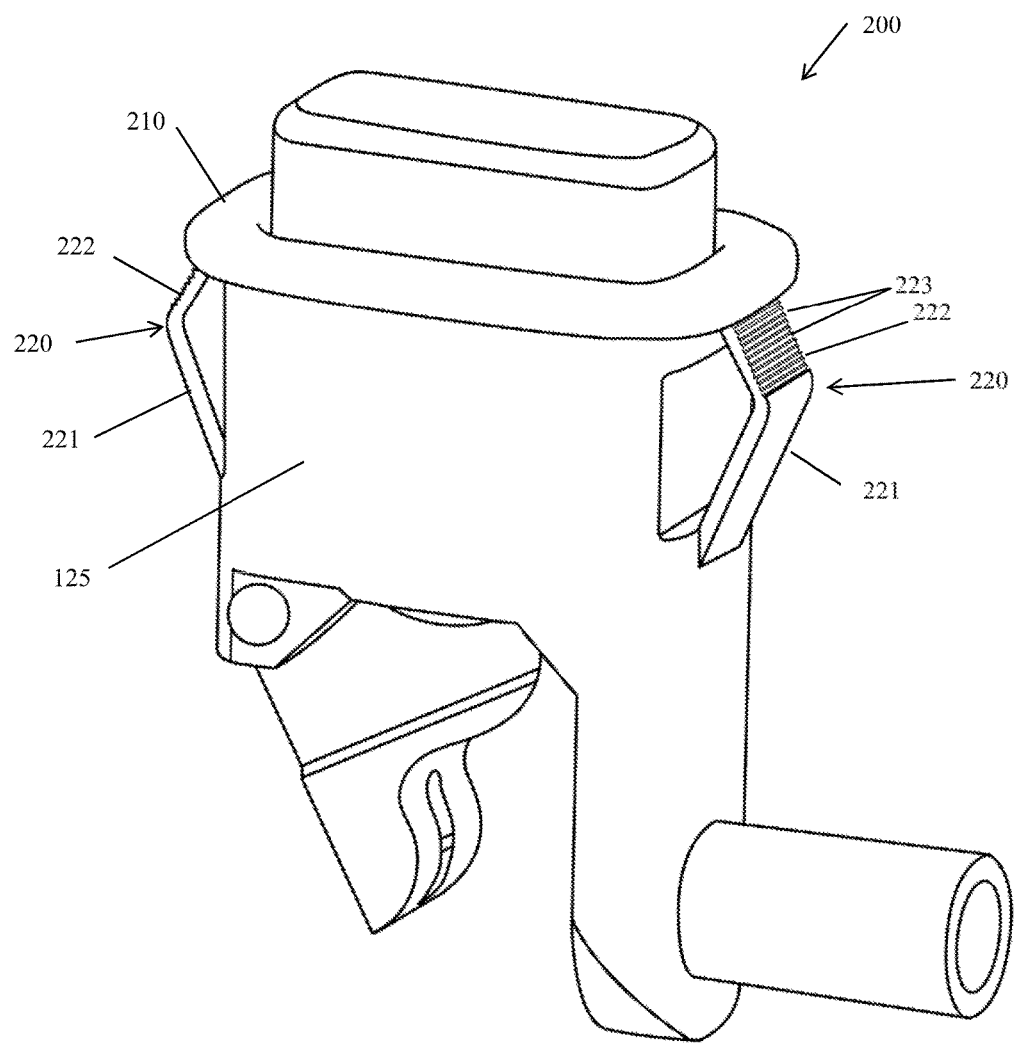
FIG. 2 is a side perspective view of a button assembly in accordance with another embodiment.

It will be understood that other configurations are possible. For example, FIG. 2 depicts a button assembly 200, in accordance with another embodiment. This assembly 200 includes a pair of flexible retaining members 220 that are defined by a first cantilevered portion 221 extending outwardly from an exterior lateral wall surface of the housing 125 at an acute angle and a second reflexed portion 222 that inwardly extends from the cantilevered portion 221 toward the bottom surface of a shoulder formed by the upper cover or cap portion 210 of the assembly 200. According to this specific embodiment, each of the retaining members 220 assumes a substantial "V-shape." After insertion of the button assembly 200 into an opening defined in the seat panel (not shown in this view), the V-shaped retaining members 220 are caused to compress inwardly to permit assembly but in which the members are caused to expand outwardly and revert to their substantial "V-shape" once the members have cleared the opening into the seat panel. As in the prior described embodiment, the retaining members 220 prevent or inhibits removal of the seated assembly against the edges of the opening in the seat panel.

In operation, the cantilevered and reflexed portions 221, 222 are configured to move inwardly or compress upon insertion of the button assembly 200 into the opening in a seat panel (not shown) and then expand outwardly within the seat panel in the position shown in FIG. 2. Frictional forces between the edge of the opening in a seat panel and each retaining member 220 may further be increased by the addition of ribs 223, to further inhibit removal of the button assembly 200 after insertion into a seat panel.

What is claimed is:

1. A button assembly for controlling a seat position and mounting on a seat panel, the button assembly comprising:
   a unitary button housing comprising a first end and a second end opposite the first end, the button housing having an outer portion at the first end for positioning over and engaging edges of an opening formed in the seat panel;
   one or more flexible retaining members attached to a portion of the button housing, the one or more flexible retaining members being configured to compress through the opening in the seat panel when assembled and expand therein positioned opposite an inner surface thereof to insure retention of the button assembly within the seat panel opening, wherein, the one or more flexible retaining members are positioned for engaging the inner surface of the seat panel;

an actuable button extending through the first end of the button housing, the actuable button being operatively connected to a lower shaft portion extending from the second end of the button housing, wherein the lower shaft portion extends centrally relative to the actuable button; and a control cable activator pivotally attached to the second end of the button housing, the control cable activator comprising:

a first engagement arm having an inwardly curved surface sized for receiving and engaging the extending lower shaft portion; and a second engagement arm for engaging a control cable, in which engagement between the extending lower shaft portion and the curved surface of the first engagement arm creates pivotal movement of the control cable activator.

2. The button assembly of claim 1, wherein the one or more flexible retaining members comprise at least one flexible finger extending outward from the button housing, wherein the flexible finger is configured to expand into the seat panel with an end of the flexible finger positioned opposite the inner surface of the seat panel, and wherein a mechanical force of the end of the flexible finger against the inner surface of the seat panel inhibits removal of the button assembly from the seat panel.

3. The button assembly of claim 2, wherein the flexible finger has a predetermined width differential between an expanded configuration and a compressed configuration, wherein the predetermined width differential of the flexible finger is selected for the end of the flexible finger in the expanded configuration to overlap one of the edges of the opening in the seat panel.

4. The button assembly of claim 1, wherein the one or more flexible retaining members comprise at least one flexible middle portion, the flexible middle portion bowing outward from the button assembly, wherein the flexible middle portion is configured to compress through the opening in the seat panel and expand into the seat panel.

5. The button assembly of claim 1, wherein the one or more flexible retaining members in a compressed position have a smaller footprint than a footprint of the opening in the seat panel, the smaller footprint of the one or more flexible retaining members facilitating insertion of the button assembly into the seat panel.

6. The button assembly of claim 1, wherein the one or more flexible retaining members in an expanded position have a larger footprint than a footprint of the opening in the seat panel, the larger footprint of the one or more flexible retaining members facilitating holding the button assembly against the opening in the seat panel.

7. The button assembly of claim 1, wherein the actuable button is configured to rotate the control cable activator about a pinned connection to the second end of the button housing to facilitate movement of the control cable from a first position to a second position.

8. The button assembly of claim 7, further comprising a control cable holder attached to the second end of the button housing and opposite the control cable activator, wherein the control cable holder facilitates securing the control cable during the movement thereof from the first position to the second position.

9. A button assembly for controlling the position of a seat, the button assembly comprising:

a button housing retaining an actuable button extending through an upper portion of the housing, the button housing being entirely fitted into an existing opening in a seat panel, the upper portion of the button housing having an outer portion that covers and engages the periphery of the seat panel opening;

the button housing further including one or more flexible retaining members extending outwardly from an intermediate portion of the button housing, the one or more flexible retaining members being shaped to compress through the seat panel opening when the button housing is initially fitted in the seat panel opening and in which the one or more flexible retaining members are sized and shaped to engage an inner surface of the seat panel to prevent the button housing from being removed from the seat panel opening;

the actuable button being operatively connected to a lower shaft portion extending from a lower portion of the button housing, wherein the lower shaft portion extends centrally relative to the actuable button;

wherein the lower portion of the button housing further includes a downwardly extending portion that retains a control cable sleeve; and a control cable activator pivotally attached to the lower portion of the button housing, the control cable activator including a first engagement end having an inwardly curved surface that is engageable with the extending lower shaft portion of the actuable button and a second engagement end that receives a control cable extending through the control cable sleeve in which the control cable activator is movable between first and second positions based on the position of the actuable button to act upon the control cable and in which engagement of the first engagement end with the extending lower shaft portion creates pivotal movement of the control cable activator.

* * * * *